(12) United States Patent
Levatte

(10) Patent No.: US 9,586,136 B2
(45) Date of Patent: Mar. 7, 2017

(54) GAMING SYSTEM AND METHOD

(71) Applicant: Ronell Levatte, Tampa, FL (US)

(72) Inventor: Ronell Levatte, Tampa, FL (US)

(*) Notice: Subject to any disclaimer, the term of this patent is extended or adjusted under 35 U.S.C. 154(b) by 449 days.

(21) Appl. No.: 14/149,298

(22) Filed: Jan. 7, 2014

(65) Prior Publication Data
US 2016/0367889 A1    Dec. 22, 2016

(51) Int. Cl.
  *A63F 9/24*    (2006.01)
  *A63F 13/30*   (2014.01)
(52) U.S. Cl.
  CPC .................................. *A63F 13/12* (2013.01)
(58) Field of Classification Search
  USPC ............................................. 463/29; 705/42
  See application file for complete search history.

(56) References Cited

U.S. PATENT DOCUMENTS

| | | | |
|---|---|---|---|
| 6,729,884 B1 | 5/2004 | Kelton et al. | |
| 7,870,067 B2* | 1/2011 | Crowl .................... | G06Q 20/10 705/329 |
| 8,239,259 B2 | 8/2012 | Borst et al. | |
| 2005/0004867 A1 | 1/2005 | Spector | |
| 2009/0024528 A1* | 1/2009 | Otero .................... | G06Q 20/10 705/44 |
| 2010/0030564 A1* | 2/2010 | Castineiras ............ | G06Q 99/00 705/329 |
| 2013/0053138 A1* | 2/2013 | Pereira .................... | A63F 13/12 463/29 |
| 2013/0085956 A1 | 4/2013 | Maloney et al. | |
| 2013/0103603 A1* | 4/2013 | Merriman .......... | G06Q 30/0279 705/329 |
| 2013/0172072 A1* | 7/2013 | Isac ........................ | G06Q 10/00 463/25 |
| 2013/0226688 A1* | 8/2013 | Harvilicz ............... | G06Q 30/02 705/14.39 |
| 2013/0232030 A1* | 9/2013 | Gockeler ................ | H04L 67/22 705/26.8 |
| 2013/0304645 A1* | 11/2013 | Shank .................. | G06Q 20/108 705/42 |

* cited by examiner

*Primary Examiner* — Masud Ahmed
(74) *Attorney, Agent, or Firm* — Albert Bordas, P.A.

(57) ABSTRACT

A gaming system, having a computer program stored on a non-transitory computer readable medium. A server is operatively associated with the non-transitory computer readable medium. Communications means enable donors to access the server and donees to receive information related to donations sent by the donors through the server. An accumulation value is measured by the computer program. A trigger value is associated with the accumulation value. A selection of at least one award recipient from the donees is made whereby the selection is rendered by the computer program once the trigger value is reached. A notification to a respective at least one of the donors is made and a transmission of at least one award corresponding to the trigger value.

13 Claims, 3 Drawing Sheets

GAMING SYSTEM AND METHOD

BACKGROUND OF THE INVENTION

1. Field of the Invention

The present invention relates to games, and more particularly, to gaming systems and methods.

2. Description of the Related Art

Applicant believes that one of the closest references corresponds to U.S. Patent Application Publication No. US 20130304645 A1, published on Nov. 14, 2013 to Shank for AUTOMATED FUTURE COLLEGE FUND. However, it differs from the present invention because Shank teaches an online automated system that enables users to automatically receive contributions and/or donations to their own or a beneficiary's college savings account with the click of an online button, which is linked to their college savings account through a secure payment facilitator such as WePay or PayPal. The users account information is set up and saved securely. This allows donations and/or contributions to be easily sent to the beneficiary's college savings account from anyone that clicks the button, such as family members or friends. This method makes it much simpler and automatic with the click of an online button to contribute/donate directly to the college savings account without having to know the account number of the college savings account, write a check, and mail it in.

Applicant believes that another reference corresponds to U.S. Patent Application Publication No. US 20130232030 A1, published on Sep. 5, 2013 to Gockeler, et al. for SOCIALLY-INTERACTIVE CAUSE PLATFORM AND METHOD OF USE. However, it differs from the present invention because Gockeler, et al. teaches a socially-interactive cause platform for multiple users and multiple causes accessible via an internet-accessible computing device, including a log-in initiator to present an optional security challenge and direct the multiple users to the socially-interactive cause platform from an internet-accessible computing device; the multiple users including a cause-creating user and a cause-following user; a cause creator to allow the cause-creating user to create a specific cause within the socially-interactive cause platform; an action coordinator to establish one or more action initiators defined by the cause-creating user in connection with the specific cause for distribution to the cause-following user; and a search engine to allow the cause-following user to search or otherwise make themselves aware of the multiple causes, and if elected, join the specific cause created by the cause-creating user and receive the one or more action initiators from the action coordinator.

Applicant believes that another reference corresponds to U.S. Patent Application Publication No. US 20130226688 A1, published on Aug. 29, 2013 to Harvilicz, et al. for CROWD FUNDING SYSTEM. However, it differs from the present invention because Harvilicz, et al. teaches a method and system to help fund projects, such as business ventures, charitable causes, and those generally in financial need, by providing a website where viewers can browse projects, select projects to fund, and donate money, or goods and services to fund the project. In the spirit of giving, the creator of a new project may also be required to make a donation or pledge to an existing project in order to have the new project published.

Applicant believes that another reference corresponds to U.S. Patent Application Publication No. US 20130172072 A1, published on Jul. 4, 2013 to Isac for METHOD AND SYSTEM FOR FACILITATING CHARITABLE DONATIONS. However, it differs from the present invention because Isac teaches a system and method for facilitating charitable donations. A first possible outcome of a game is associated with a first charity, online wagers against the first possible outcome are accepted and in response to the first possible outcome actually occurring, all, or a portion, of the wagered sums are electronically credited to an account associated with the first charity.

Applicant believes that another reference corresponds to U.S. Patent Application Publication No. US 20130103603 A1, published on Apr. 25, 2013 to Merriman for SYSTEM AND METHOD FOR CHARITABLE FUNDRAISING. However, it differs from the present invention because Merriman teaches a system and method of making a charitable donation on a mobile device that includes reading a code with the mobile device and requesting code related content in response to reading the code. The code related content is received from a server, the code related content comprising at least one short code associated with a charitable organization. In some embodiments, additional content may be provided to provide incentive to the user to make a donation. At least one of a SMS or MMS message is sent using the short code to make a donation to the charitable organization.

Applicant believes that another reference corresponds to U.S. Patent Application Publication No. US 20130085956 A1, published on Apr. 4, 2013 to Maloney, et al. for METHOD OF DONATING TO A CHARITY VIA AN EVENT OUTCOME. However, it differs from the present invention because Maloney, et al. teaches a system and method to facilitate donating to a charity with a donation level linked to the outcome of a specific event or series of events. Participants raising money for a charity log onto a website where they select a charity, an event and a performance based wager. A donor, planning to contribute to a charity, logs onto the same website, and selects a charity, an event and a participant, and agrees to participate in the wager proposed by the participant. The donor authorizes payment of the proposed wager to the charity dependent on the participant performance. Participants may be individuals, teams or individual members of a team. The charities may be any registered or recognized charity. The events may be any on which a quantifiable prediction may be made. Donors may be individuals, corporations, associations, partnerships, special interest groups or fan clubs.

Applicant believes that another reference corresponds to U.S. Patent Application Publication No. US 20130053138 A1, published on Feb. 28, 2013 to Pereira, et al. for SYSTEM AND METHOD FOR COLLECTING DONATIONS TO PLAY COMPUTER GAME. However, it differs from the present invention because Pereira, et al. teaches a computer-implemented method for providing a computer game such as, for example, a social network game that includes steps of hosting the game at a server, receiving a request from a player to play the game, enabling game play, requesting a donation from the player to continue play or to enable access to a game feature, and continuing game play or enabling access to the game feature only if the donation is received. A donation request screen may be displayed at the transition from one completed game level to a successive game level, when the game is over, or at any other time during game play. Multiple donation amounts may be specified on the donation request screen, each donation amount providing a different number of game credits. This method enables donations to be collected for a charitable entity while playing computer games. The method also raises social awareness through game play.

Applicant believes that another reference corresponds to U.S. Patent Application Publication No. US 20100030564 A1, published on Feb. 4, 2010 to Castineiras for SYSTEM AND METHOD FOR CONDUCTING A FUNDRAISING RAFFLE. However, it differs from the present invention because Castineiras teaches a system and method for conducting a fundraising raffle venture between a sponsor and a fundraiser. The fundraiser offers raffle tickets to others, collects raffle revenue, and arranges a drawing to select a winner. The revenue is distributed as a jackpot to the winner and as gain to the sponsor. The sponsor may identify contacts and the fundraiser may send to the contacts promotional messages for the raffle. The promotional messages may be composed by, or merely previewed and edited by, the sponsor. The raffle venture may specify initial proportions for distribution of revenue to the sponsor and the fundraiser. The proportions may be adjusted before the drawing. The method may be practiced via a website and may include establishing a sponsor web page that optionally contains content uploaded by the sponsor. There may be a blog site, an online social networking site and a webcast of the drawing.

Applicant believes that another reference corresponds to U.S. Patent Application Publication No. US 20090024528 A1, published on Jan. 22, 2009 to Otero for METHOD AND SYSTEM FOR CHARITABLE FUND RAISING IN CONJUNCTION WITH GAME-OF-CHANCE PARTICIPATION BY DONORS. However, it differs from the present invention because Otero teaches a method for making a contribution to a charitable organization through a financial transactions device by a participant having an account with a financial institution accessible through the financial transaction device. The method comprising: (a) the participant conducting a financial transaction at the financial transactions device, the financial transaction involving the financial institution; (b) the participant solicited to make a contribution to the charitable organization through the financial transactions device; (c) the participant making the contribution by deduction from the participant's account at the financial institution; (d) crediting the contribution to an account of the charitable organization; (e) soliciting the participant to participate in a game of chance through the financial transactions device; (f) the participant selecting a game entry object or automatically receiving the game entry object; (g) closing participation in the game of chance; (h) selecting a game winning object; (i) comparing the participant's game entry object with the game winning object; (j) declaring the participant to be a winner if there is a predetermined relationship between the game entry object and the game winning object; and (k) crediting a prize amount, if any, to the participant's account.

Applicant believes that another reference corresponds to U.S. Patent Application Publication No. US 20050004867 A1, published on Jan. 6, 2005 to Spector for NETWORK-BASED DONATION MANAGEMENT SYSTEM. However, it differs from the present invention because Spector teaches techniques for network-based management and tracking of donations and associated donation information. More specifically, a donation management system that comprises a group manager module and a donation manager module. The group manager module presents a user interface with which a donor interacts to create a private donation group. Donors may join the private donation group by invitation only and the private donation group generally limits non-member donors from viewing information regarding the private donation group. The donation manager module receives electronic donations from members of the private donation group via a computer network. As such, the donation management system provides a comprehensive and adaptive approach to managing donations in a secure and private manner.

Applicant believes that one of the closest references corresponds to U.S. Pat. No. 8,239,259 B2 issued to Borst, et al. on Aug. 7, 2012 for DONATIONS IN A VIRTUAL ENVIRONMENT. However, it differs from the present invention because Borst, et al. teaches a donation aspect for a website, whereby amounts of donations are limited and users are given awards based on their donations.

Applicant believes that another reference corresponds to U.S. Pat. No. 7,870,067 B2 issued to Crowl on Jan. 11, 2011 for DONATION SYSTEM. However, it differs from the present invention because Crowl teaches a donation system that would encourage registered individuals to make small contributions to a charity or political campaign (or cause of their choice) as well as facilitate the process of doing so. The system provides a central location for all donation activity and works as a "contribution bundler" to empower those otherwise disempowered in the political marketplace. The system also acts as a "Civic Marketplace" that gives citizens a central location to turn to for civic information. The system provides safety features for registered users.

Applicant believes that another reference corresponds to U.S. Pat. No. 6,729,884 B1 issued to Kelton, et al. on May 4, 2004 for E-CRITTER GAME FOR TEACHING PERSONAL VALUES AND FINANCIAL RESPONSIBILITY TO A CHILD. However, it differs from the present invention because Kelton, et al. teaches an Internet-based game for teaching personal values and financial responsibility to a child that includes interactive game events, an adventure story activity with selectable story elements, a scoring system awarding a virtual collectible creature having artificial intelligence characteristics and characteristics mimicking a financial instrument, and indicia of account information.

Other patents describing the closest subject matter provide for a number of more or less complicated features that fail to solve the problem in an efficient and economical way. None of these patents suggest the novel features of the present invention.

SUMMARY OF THE INVENTION

In one embodiment, the present invention is a gaming system, comprising a computer program stored on a non-transitory computer readable medium. A server is operatively associated with the non-transitory computer readable medium. Communications means enable donors to access the server and donees to receive information related to donations sent by the donors through the server. An accumulation value is measured by the computer program, and a trigger value is associated with the accumulation value. A selection of at least one award recipient is made from the donees, whereby the selection is rendered by the computer program once the trigger value is reached. Notification to a respective at least one of the donors is made and transmission of at least one award corresponding to the trigger value.

Communications by at least one of the donors is an Internet-based communication whereby the at least one of the donors uses at least one of a computer, a tablet computer, a smart phone, or means of accessing Internet in order to access the server.

A respective of the donees receives an electronic notification originating from the server including the information related to the donations. The electronic notification includes the accumulation value, the trigger value, the selection of the at least one of the donees, the notification to the respective at least one of the donors, and the transmission of the at least one award.

The accumulation value is at least one of a time period, a monetary value, or combinations thereof. The trigger value is selected by an owner or operator of the gaming system, whereby the trigger value is based upon the accumulation value. The selection of the at least one award recipient is done by at least one of random selection, selection based on nomination, selection based upon votes submitted to the gaming system, or combinations thereof. The at least one award recipient is selected from a list of the donees accessing the gaming system, and the at least one award is presented based upon a vote of persons accessing the gaming system.

In another embodiment, the gaming system is presented as a television game show. The at least one award recipient is selected from a contestant pool. The contestant pool includes at least one presentation from each contestant whereby the presentation is for soliciting selection for receiving the at least one award. The at least one award is presented based upon a vote of persons viewing the television game show.

The gaming system further comprises a method of presenting the at least one award to the at least one award recipient, comprising the steps of providing at least one presentation from respective the donees; viewing the at least one presentation; voting on a desired of the donees, whereby the vote relates to selection of the at least one award recipient; calculating received votes from the voting; and awarding the at least one award to the at least one award recipient based on the calculated votes.

The method further providing the gaming system as a television game show. The method of claim further characterized in that a respective of the donees receives an electronic notification originating from the server including the information related to the donations. The electronic notification including the accumulation value, the trigger value, the selection of the at least one of the donees, the notification to the respective at least one of the donors, and the transmission of the at least one award.

The method of claim further characterized in that the accumulation value is at least one of a time period, a monetary value, or combinations thereof; the trigger value is selected by an owner or operator of the gaming system whereby the trigger value is based upon the accumulation value.

The method of claim further characterized in that the selection of the at least one award recipient is done by at least one of random selection, selection based on nomination, selection based upon votes submitted to the gaming system, or combinations thereof.

The method of claim further characterized in that the at least one award recipient is selected from a list of the donees accessing the gaming system.

It is one aspirational objective of the system and method of the present invention to give individuals an avenue and access to help each other succeed or even survive in a tough and hard economy.

It is another object of this invention to provide such a system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
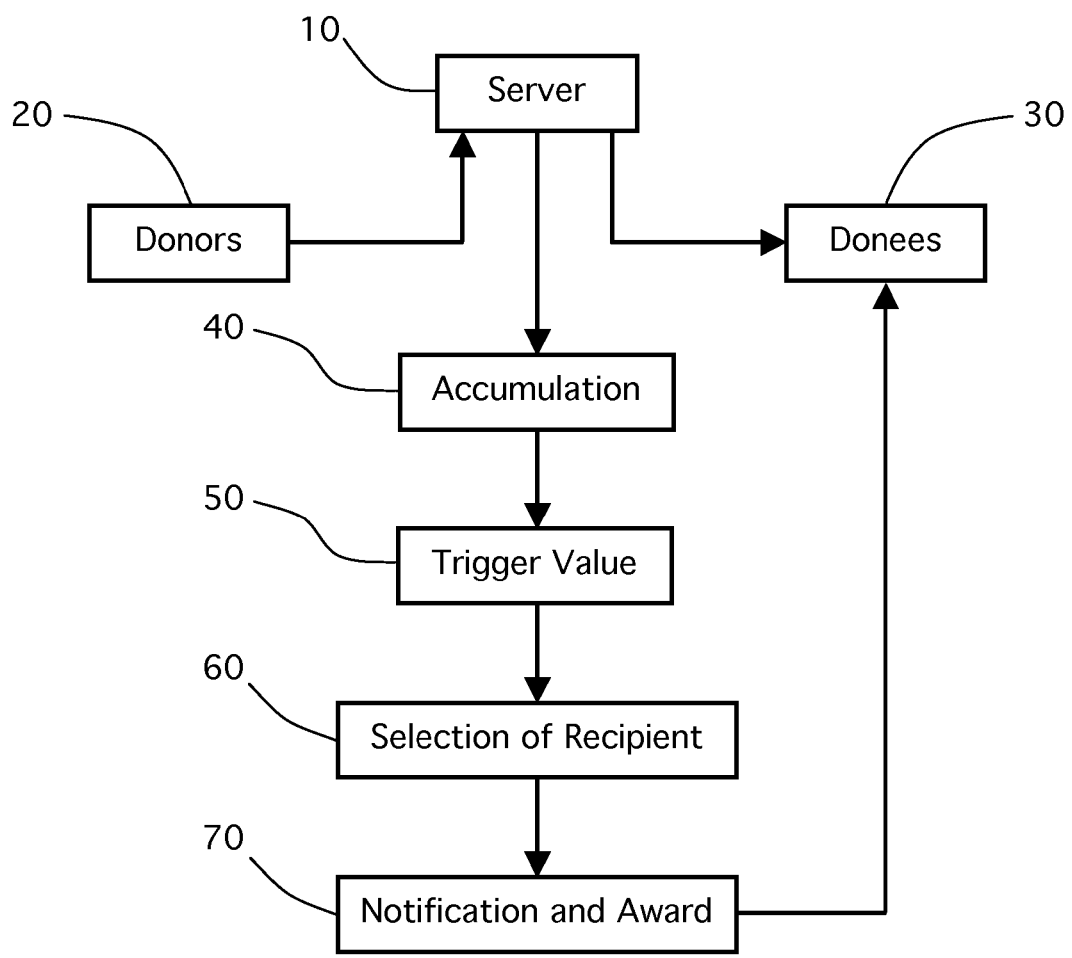
FIG. 1 is a flowchart demonstrating one embodiment of the present invention.

Referring now to the drawings, the present invention, as seen in FIG. 1, includes a program stored on a non-transitory computer readable medium. The program is operatively associated with server 10. Server 10 is configured as an appropriate input-output communications means as generally known the art. In one embodiment, server 10 receives input information from at least one donor 20 and provides output information to a selected person, persons, or organizations, in which money will be donated, generally referred to as donee 30. In one embodiment, the system of the present invention is configured such that information provided to server 10 cords and updates an accumulation value of money donated 40 and continues to monitor accumulated donations for each specific donee 30 until a trigger of value threshold 50 is achieved. Trigger value threshold 50 is a numeric value specific for each particular donee 30. The system of the present invention is configured such that each individual donee 30 is on a particularized monetary trigger value threshold 50. Once an individual donee 30 reaches monetary trigger value threshold 50, the system selects a recipient 60 for receipt of an award. In one embodiment, selection of recipient 60 provides a monetary award to one particular donee 30. In another embodiment, multiple monetary awards are presented. The system of the present invention further provides notification 70 to at least one donor 20 and the delivery of the award to selected donee 30.

Figure 2:
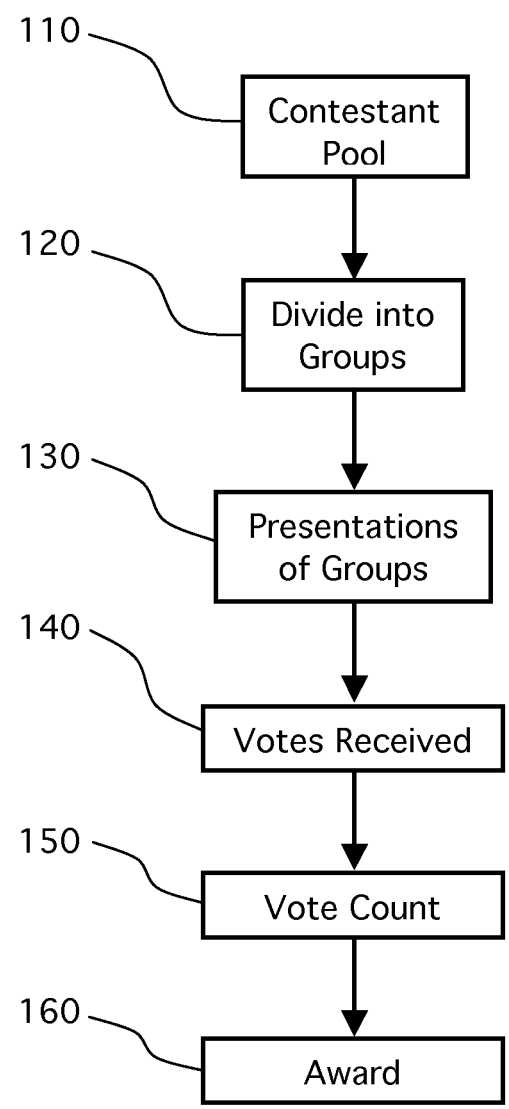
FIG. 2 is a flowchart demonstrating one embodiment of the present invention including a step of receiving and counting votes in order to determine the recipient of an award.

As seen in FIG. 2, one embodiment provides a pool of contestants 110 that is divided into groups 120. Groups 120 provide presentations 130 that are intended to solicit votes for a winning participant or group. Votes are received 140, counted 150, and at least one winner receives award 160.

Figure 3:
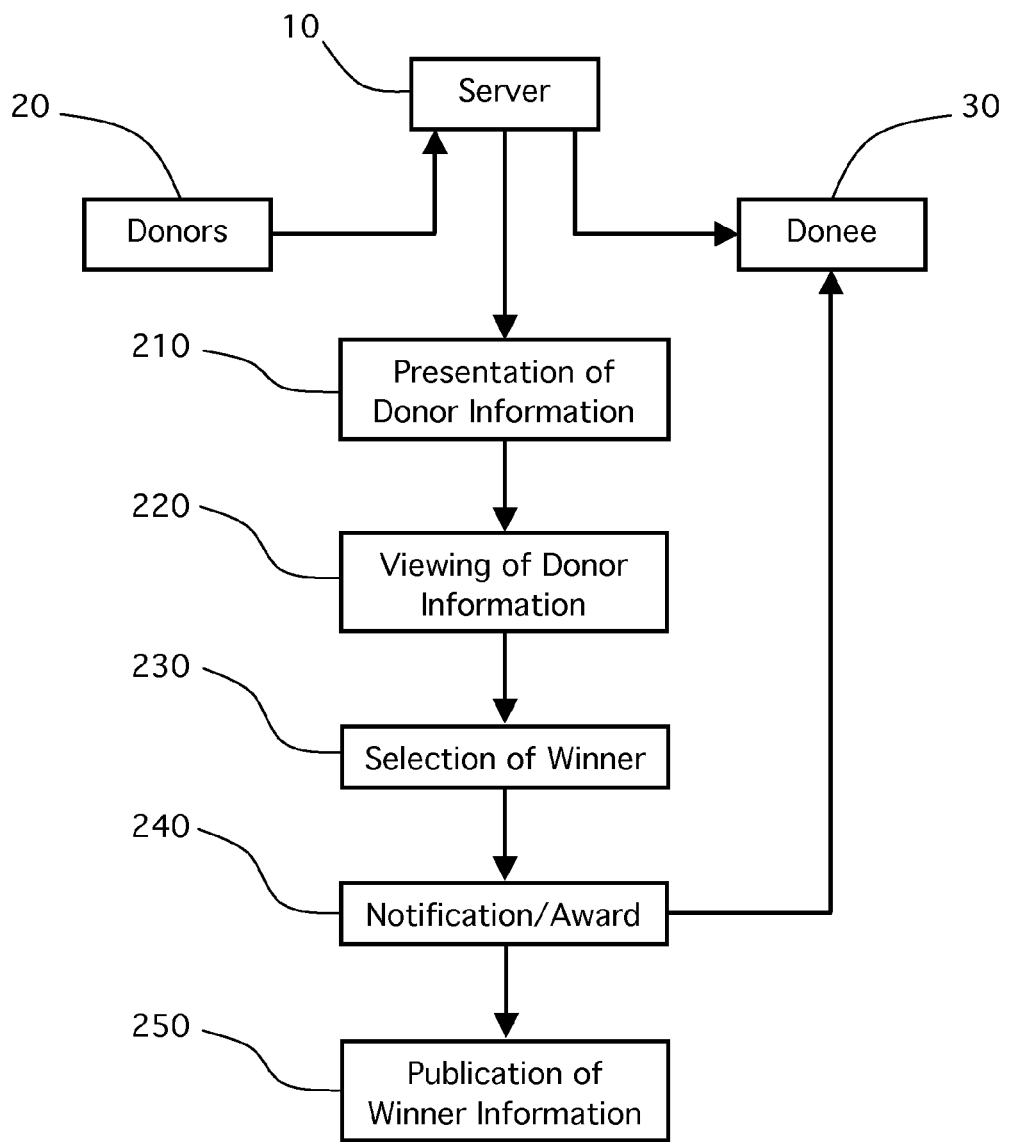
FIG. 3 is a flowchart demonstrating one embodiment of the present invention including a step of receiving and counting votes in order to determine the recipient of an award as well as publication of at least one award winner.

As seen in FIG. 3, this embodiment provides for a system and method whereby donors 20 present information to server 10 to permit presentation of donor information 210 that is viewable by viewers 220 that are accessing the system of the present invention controlled by server 10. A winner is selected 230 and there is notification of the award 240 on publication of the winner information 250.

In one embodiment, the system and method of the present invention includes an online website that invites people to donate or pay a minimum predetermined monetary amount anytime they want, like how political campaigns are funded or how a lottery ticket is purchased, but without purchasing a ticket or anything physical.

However, periodically, such as every month, a percentage of the total amount is awarded to one of the thousands or millions of people or entities who have donated. Referring back to FIG. 1, accumulation 40 refers to accumulation of a dollar amount, accumulation of a period of time, or combinations thereof. For example, the system and method of the present invention is configured such that once a particular time period has lapsed, an award recipient is selected 60. Alternatively, once a particular dollar amount has been accumulated, an award recipient is selected 60. In another embodiment, the system and method of the present invention is configured to require each of the passing of a particular time period accumulation or a specific dollar amount.

In an environment where the accumulation 40 is a dollar amount, once the system of the present invention reaches a particular dollar amount, a website monitors the accumulation 40 and displays how the particularized system increases the donated money and ultimately prepares a percentage for at least one award.

In one embodiment, there will be different categories to donate to, for example: Business Categories, Education Categories, Health Categories, Home Categories, Vehicle Categories, Legal Fees Categories, etc. Each category will payout to one selected winner, donee 30. A picture and interview of each winner or business owner etc. will be posted on the website. Also the name, city and state of each person who donates and the amount they donated will be posted on the website as well. Also the total amounts collected and paid out will be posted on the website in real time. The objective is to give individuals an avenue and access to help each other succeed or even survive in a tough and hard economy.

In one embodiment the present invention is formatted as a television game or game show. It is contemplated that the television game will follow the same general steps and rules relating to the presentation of the system and method in an online environment.

In the embodiment whereby the system and method is provided at a television game the following represents one preferred embodiment of the present invention:
CONTESTANTS:
12 contestants (6 males and 6 females) will be narrowed down from hundreds of thousands by a panel of judges;
12 contestants will be divided into 6 groups that consist of 1 female and 1 male; and
Top 12 contestants will be now judged by consumers (viewers) all over the world until 1 female and 1 male wins.
Viewers are allowed to send emails and financial support to each contest before and after their performances.
All 12 contestants must compete within the instructions giving by the company.
Only one male and one female can win each season.
Both winners automatically return to compete with the new top contestants for the money.
Contestants will have to win over voters with what they want and why they want it.
AWARDS:
A predetermined percentage of the money donated.
JUDGES & HOST:
1 main host that is an entertainer
2 co-hosts per each of the 6 groups
1 fashionable stylist per group
AIRS:
This show only airs at predetermined time periods such as once (1) a year
AGES:
12 to 18-years old In an environment where the system and method of the present invention is presented as an online game, the following represents one covert embodiment of the present invention:

An online website that invites people to donate or pay a predetermined minimum monetary amount, such as $1 dollar, anytime they want, like how political campaigns are funded or how a lottery ticket is purchased but without purchasing a ticket or anything physical. However, every month a percentage of the total amount is awarded to one of the thousands or millions of people who have donated. Once the site grows, the money will be awarded every week or even every day instead of monthly to one person or business, etc.

There will be different categories to donate to for example Business Categories, Education Categories, Health Categories, Home Categories, Vehicle Categories, Legal Fees Categories, etc. Each category will payout to one selected winner. A picture and interview of each winner or business owner etc. will be posted on the website. Also the name, city and state of each person who donates and the amount they donated will be posted on the website as well. Also the total amounts collected and paid out will be posted on the website in real time.

In one embodiment, the following are proposed rules online game environment:
The winner will be selected by a majority vote from all the viewers or participates, who choose to vote, no membership needed.
Each person who pays/donates a predetermined amount, such as $1 or more, will have to become a member.
A person can win as many times as they are selected but ideally a new winner is selected each time. It's strictly up to the voters/viewers
1 male and 1 female wins in each category
ages 12 to 18 years old can win The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A gaming system, comprising:
A) a computer program stored on a non-transitory computer readable medium;
B) a server operatively associated with said non-transitory computer readable medium;
C) communications means whereby donors access said server and donees receive information related to donations sent by said donors through said server;
D) an accumulation value measured by said computer program, said accumulation value is at least one of a time period, a monetary value, or combinations thereof;
E) a trigger value associated with said accumulation value;
F) a selection of at least one award recipient from said donees whereby said selection is rendered by said computer program once said trigger value is reached; and
G) notification to a respective at least one of said donors that said recipient was selected for at least one award, and transmission of said at least one award corresponding to said trigger value, said selection of said at least one award recipient is done by at least one of random selection, selection based on nomination, selection based upon votes submitted to said gaming system, or combinations thereof, when said gaming system is presented as a television game show to air by broadcasting, said at least one award is presented based upon a vote of persons viewing said television game show.

2. The gaming system set forth in claim 1, further characterized in that communications by at least one of said donors is an Internet-based communication whereby said at least one of said donors uses at least one of a computer, a tablet computer, a smart phone, or means of accessing Internet in order to access said server.

3. The gaming system set forth in claim 1, further characterized in that a respective of said donees receives an electronic notification originating from said server including said information related to said donations, said electronic notification including said accumulation value, said trigger value, said selection of said at least one of said donees, said notification to said respective at least one of said donors, and said transmission of said at least one award.

4. The gaming system set forth in claim 1, further characterized in that said trigger value is selected by an owner or operator of said gaming system whereby said trigger value is based upon said accumulation value.

5. The gaming system set forth in claim 1, further characterized in that said at least one award recipient is selected from a list of said donees accessing said gaming system.

6. The gaming system set forth in claim 1, further characterized in that said at least one award recipient is selected from a contestant pool.

7. The gaming system set forth in claim 6, further characterized in that said contestant pool includes at least one presentation from each contestant whereby said presentation is for soliciting selection for receiving said at least one award.

8. The gaming system set forth in claim 6, further characterized in that said at least one award is presented based upon a vote of persons accessing said gaming system.

9. The gaming system set forth in claim 1, further comprising a method of presenting said at least one award to said at least one award recipient, comprising the steps of:
H) providing at least one presentation from respective said donees;
I) viewing said at least one presentation;
J) voting on a desired of said donees, whereby said vote relates to selection of said at least one award recipient;
K) calculating received votes from said voting; and
L) awarding said at least one award to said at least one award recipient based on said calculated votes.

10. The method of claim 9, further characterized in that a respective of said donees receives an electronic notification originating from said server including said information related to said donations, said electronic notification including said accumulation value, said trigger value, said selection of said at least one of said donees, said notification to said respective at least one of said donors, and said transmission of said at least one award.

11. The method of claim 9, further characterized in that said trigger value is selected by an owner or operator of said gaming system whereby said trigger value is based upon said accumulation value.

12. The method of claim 9, further characterized in that said selection of said at least one award recipient is done by at least one of random selection, selection based on nomination, selection based upon votes submitted to said gaming system, or combinations thereof.

13. The method of claim 9, further characterized in that said at least one award recipient is selected from a list of said donees accessing said gaming system.

* * * * *